(12) United States Patent
Badger

(10) Patent No.: US 8,373,389 B2
(45) Date of Patent: Feb. 12, 2013

(54) BATTERY PACK CHARGING SYSTEM WITH MANUALLY MANEUVERED CHARGE HEAD

(76) Inventor: Berkley C. Badger, Tarpon Springs, FL (US)

( * ) Notice: Subject to any disclaimer, the term of this patent is extended or adjusted under 35 U.S.C. 154(b) by 448 days.

(21) Appl. No.: 12/657,552

(22) Filed: Jan. 22, 2010

(65) Prior Publication Data

US 2011/0181241 A1    Jul. 28, 2011

(51) Int. Cl.
*H02J 7/00* (2006.01)
*H02J 7/16* (2006.01)
*B60W 10/24* (2006.01)
*B60M 1/34* (2006.01)
*B60P 1/04* (2006.01)

(52) U.S. Cl. ........ 320/109; 320/104; 320/151; 320/152; 320/153; 180/65.1; 180/65.21; 180/65.27; 180/65.29; 414/281; 191/23 A

(58) Field of Classification Search .................. 320/104, 320/109
See application file for complete search history.

(56) References Cited

U.S. PATENT DOCUMENTS

| | | | | |
|---|---|---|---|---|
| 5,306,999 A | * | 4/1994 | Hoffman | 320/109 |
| 5,627,448 A | * | 5/1997 | Okada et al. | 439/133 |
| 5,992,572 A | * | 11/1999 | Gilliland et al. | 187/231 |
| 6,609,622 B2 | * | 8/2003 | Forsyth | 212/258 |
| 7,004,710 B1 | * | 2/2006 | Quade | 414/395 |
| 2007/0200532 A1 | * | 8/2007 | Vaux | 320/104 |
| 2009/0206792 A1 | * | 8/2009 | Hyatt | 320/114 |
| 2010/0017249 A1 | * | 1/2010 | Fincham et al. | 705/8 |
| 2010/0102775 A1 | * | 4/2010 | Chander et al. | 320/109 |
| 2010/0277128 A1 | * | 11/2010 | Tam et al. | 320/150 |
| 2011/0022222 A1 | * | 1/2011 | Tonegawa | 700/232 |
| 2011/0029144 A1 | * | 2/2011 | Muller et al. | 700/293 |
| 2011/0169447 A1 | * | 7/2011 | Brown et al. | 320/109 |

* cited by examiner

*Primary Examiner* — Drew A Dunn
*Assistant Examiner* — Nathaniel Pelton
(74) *Attorney, Agent, or Firm* — David L. Banner

(57) ABSTRACT

A charging system which is particularly suitable for recharging the batteries of electrically powered motor vehicles using a charge head with multiple contacts that mate with an array of charge receiving electrodes onboard the vehicle being recharged. The charge head is supported from overhead, and may, using a power assisted system, be lowered, into place against the array of charge receiving electrodes onboard the vehicle. Switches may be spaced apart so that, like the grasping elements of the handle, use of both hands is required. The charge head causes breaking of series connections of batteries within the vehicle so that individual batteries may be charged in parallel. A battery temperature monitor is provided. An annunciator locally or remotely signals errors or indicates completion of charge. Payments are accepted near the charge head, thereby allowing for commercial operation.

23 Claims, 3 Drawing Sheets

BATTERY PACK CHARGING SYSTEM WITH MANUALLY MANEUVERED CHARGE HEAD

CROSS-REFERENCE TO RELATED APPLICATIONS

This application is related to application Ser. No. 12/657,533, now issued as U.S. Pat. No. 8,174,238, entitled CHARGING CONTACT ARRAY FOR ENABLING PARALLEL CHARGING AND SERIES DISCHARGING OF BATTERIES, filed concurrently herewith and incorporated herein in its entirety by reference.

FIELD OF THE INVENTION

The present invention pertains to apparatus for charging of battery packs, and more particularly, to apparatus which is suitable for the public (i.e., untrained lay persons) to charge battery packs of electrically operated vehicles.

BACKGROUND OF THE INVENTION

Electrically powered motor vehicles typically carry batteries for supplying operating power. These batteries may periodically need to be recharged from an external power source. Recharging can be accomplished in a number of ways. The vehicle may be a purely electrically operated vehicle, so that operation is fully dependent upon charge remaining in the batteries. Alternatively, the vehicle may be a hybrid having an onboard internal combustion engine, wherein the internal combustion engine may take over from the electrical power plant or may supplement the electrical power plant by providing some of the power necessary for operation, and/or by charging the vehicle's onboard batteries. In addition, the vehicle may have a regenerative braking feature in which braking operates a dynamic brake which also functions as a generator for recharging the batteries.

Regardless of the type of vehicle or the operating scheme, commercially available electrically operated vehicles both of the purely electrical type or the so-called plug-in hybrid type, it may be necessary or desirable that the batteries be recharged while the vehicle is enroute. Such a charging need is similar to the need in a vehicle powered by fossil fuel (e.g., gas or diesel) that periodically stops at a fueling station to refill the vehicle's fuel tank(s).

Recharging of batteries suitable for powering electrically powered vehicles presents conflicting demands. It is desirable to minimize the time interval during which the vehicle is being charged. However, it is also desirable to limit voltages present during charging due to safety concerns presented by the relatively high operating voltage used in many electrically powered vehicles. It is, however, possible to recharge batteries at limited voltage by charging individual cells or groups of batteries in parallel. One approach is to separate individual cells or batteries normally series connected (to achieve the necessary high operating voltage), recharge the cells in parallel at a relatively low voltage, and then reconnect the batteries in series again. However, if the charging time is to be limited, the current must be increased accordingly.

Inductive couplings have been developed to facilitate ready battery recharging. However, inductive couplings introduce inefficiencies, notably, heating losses from induction. It is preferable to provide direct mechanical connection between charging conductors and those conductors leading to the batteries being charged to avoid inductive losses.

Batteries can be charged over long periods of time (i.e., trickle charged), for example overnight at the residence of the operator or all day at the operator's place of business. However, even the largest capacity contemporary batteries are limited as to the practical cruising range of their associated vehicles. For relatively short "out and back" trips such as commuting to a workplace, an overnight trickle charge may be sufficient to power the vehicle. However, for longer trips, it becomes very likely that many electric vehicles will have to be recharged between a departure point and a destination.

Passenger vehicles are consumer items. That is, they are typically operated by laymen, or people who are not trained in the mechanics and electrical systems of passenger vehicles. It is, therefore, necessary that any system for recharging the batteries of electrically powered vehicles be simple to operate and include inherent safety features so that consumers can safely recharge their vehicles.

It is, therefore, highly desirable to provide charging apparatus that may readily be used by ordinary motorists driving electrical vehicles. Despite relatively great size and weight which are demanded by relatively high current capacity, the charging apparatus/equipment must be reasonably easy to maneuver and inherently safe.

There exists a need for a practical way to arrange relatively expeditious, relatively safe recharging at commercial premises for operators of electrical vehicles.

SUMMARY OF THE INVENTION

In accordance with the present invention there is provided a charging system which is particularly suitable for recharging the batteries of electrically powered motor vehicles by consumers at commercial or other dedicated recharging stations. The charging system of the invention has a charge head, typically having multiple contacts that may be coupled to an array of charge receiving electrodes onboard the vehicle being recharged. The charge head is supported from overhead, and may be lowered into place against the array of charge receiving electrodes onboard the vehicle being charged.

The charging system may have a power assisted charge head lowering and raising system, and may also be jointed and/or articulated so as to enable the charge head to move throughout six degrees of freedom when being maneuvered into place against the array of charge-receiving contacts associated with the electrically powered vehicle. The charge head typically has a handle comprising spaced apart grasping elements so as to oblige the use of both hands when maneuvering the charge head into place. Dead man switches may be included to inhibit system operations unless both hands are used simultaneously. The dead man switches may be spaced apart so that, like the grasping elements of the handle, both hands are required.

The charging electrodes of the charge head may be partially covered by a protective cover to help prevent live charging electrodes from contacting an unintended surface and being unintentionally grounded.

The charging head may have a plurality of tapered pins to facilitate alignment of the charging head relative to an array of charge receiving electrodes on the vehicle having corresponding openings for receiving such pins. Other alignment mechanisms are, of course, possible.

The charging system may incorporate a monitoring system that monitors the battery temperature and/or an indication of completion of charging. Charge rate may be varied with battery temperature, such as being reduced in rate if relatively high battery temperatures are encountered. In addition to monitoring the temperature of the batteries, the system may be configured to measure cable temperatures, the temperatures of on or more cable connections, or the temperature of the charging contacts. The monitoring system may annunciate completion of charging. Such annunciation may be audible or visual and may be local or remote. Further, annunciation may include a cellular call or text message or another electronic message to cellular telephone, a personal digital assistant (PDA), a pager, or any other suitable device.

The charging system may incorporate a payment acceptance apparatus, such as a point of sale credit or debit card processor, so that a consumer can pay for the charge at the charging apparatus.

The charging system may include a security system for identifying the motor vehicle to assure that the vehicle is authorized to be charged, is not stolen, and for other security related purposes.

It is, therefore, an object of the invention to provide a charging mechanism for batteries of an electrically powered vehicle or any other mobile device containing batteries requiring periodic recharging.

It is another object of the invention to provide a charging mechanism having a movable charging head adapted to electrically connect to an array of charge receiving contacts on an electrically powered vehicle.

It is an additional object of the invention to provide a charging mechanism that may incorporate means for accepting payment for recharging the batteries of the electrically powered vehicle.

It is a further object of the invention to provide a security feature to perform some type of security check on a motor vehicle being charged.

It is a still further object of the invention to provide a charging mechanism having an annunciator to inform an operator of a safety concern or of completion of the recharging operation.

It is yet another object of the invention to provide a charging mechanism wherein an annunciator sends an electronic message to an electronic device such as a cellular telephone, a PDA, a pager, or another electronic device.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention provides a charging system for recharging the batteries of electrically powered vehicles or other mobile devices containing batteries requiring periodic recharging.

Figure 1:
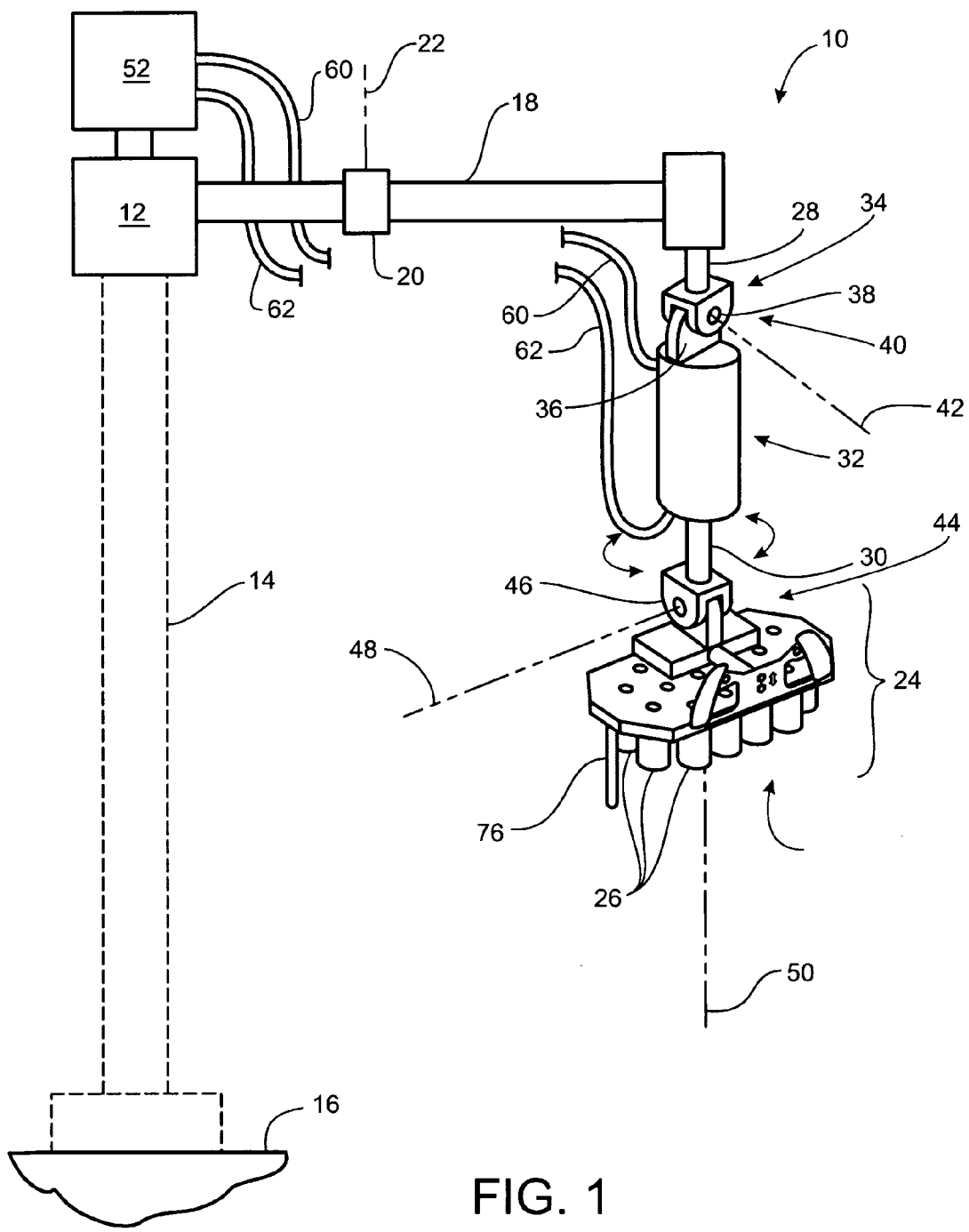
FIG. 1 is a simplified schematic diagram of the charging system in accordance with the invention in an intended operating environment for charging the batteries of an electrically powered vehicle.

Referring first to FIG. 1, there is shown a simplified schematic diagram of the charging system in accordance with the invention in an intended operating environment for charging the batteries of an electrically powered vehicle.

Figure 2:
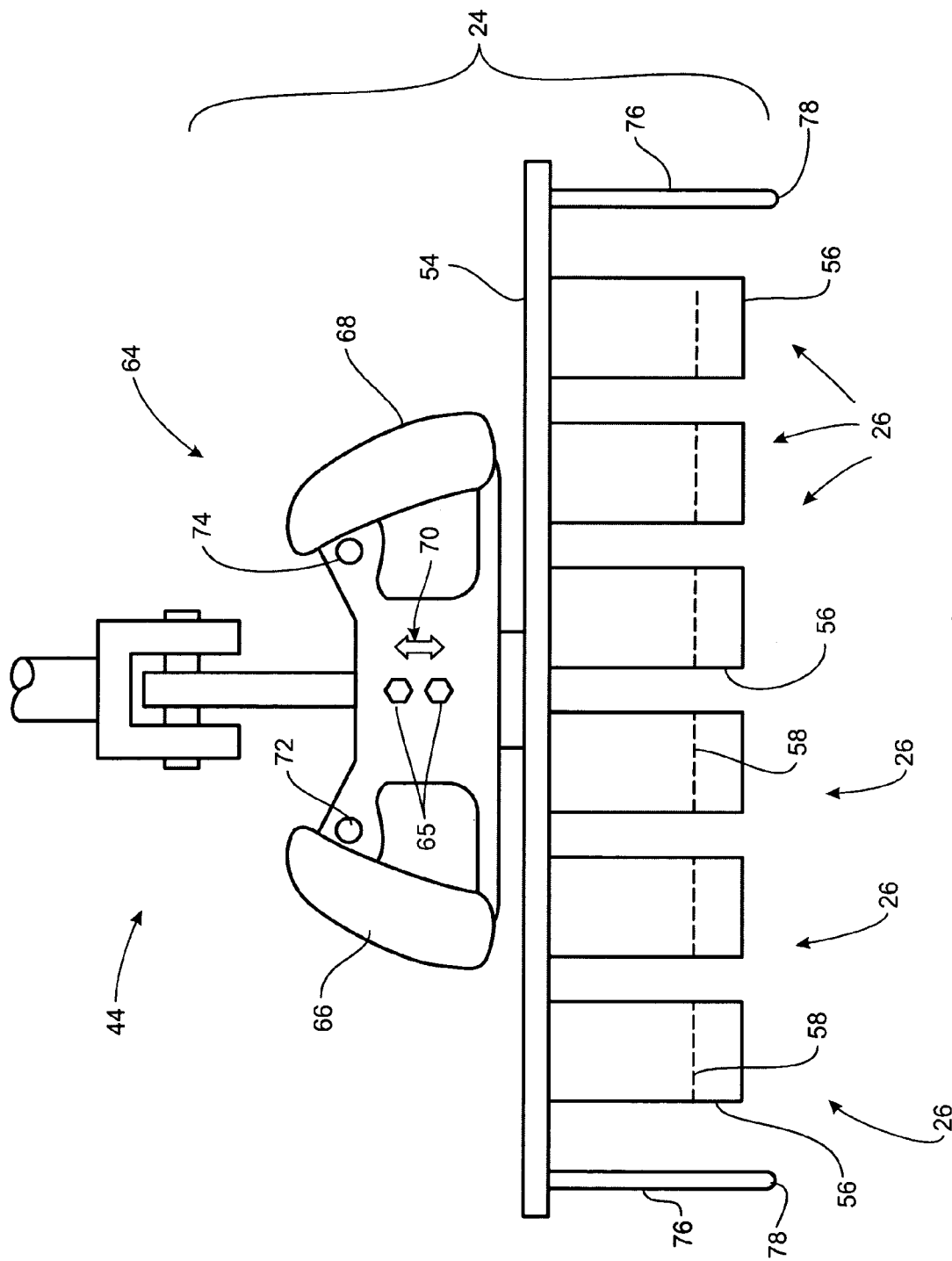
FIG. 2 is an enlarged front elevational detail view of the charge head portion of the system of FIG. 1.
Figure 3:
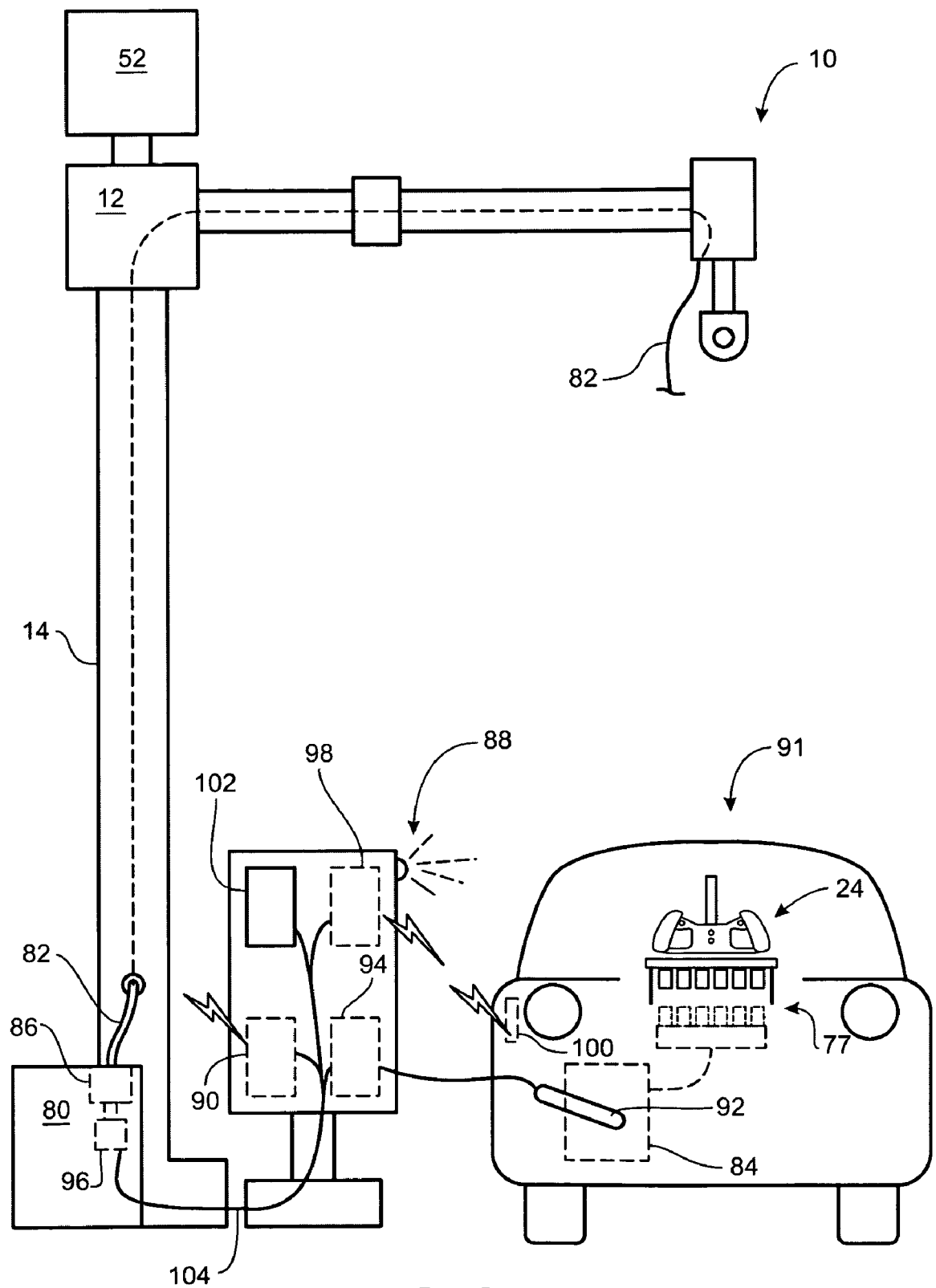
FIG. 3 is a detailed diagrammatic perspective view of the charging apparatus of the invention.

A charging electrode system 10 is provided for engaging an array of associated charging electrodes 26 (FIG. 2) disposed in charge transferring relation thereto within an electrically powered vehicle 91 (FIG. 3). The charging electrode system 10 is intended to enable an operator, not shown, of an electrically powered motor vehicle 91 to connect his or her vehicle 91 to commercial recharging facilities encountered along a route being traversed, and to expeditiously charge battery pack 84 within or associated with vehicle 91.

A portion of the charging electrode system 10 of the invention as shown in FIG. 1 comprises an overhead support 12 for connecting the overhead portion of the charging electrode system 10 to a supporting environmental surface or structure 16. For example, overhead support 12 may be supportably fixed to a tower 14 anchored to a ground surface 16. It will be recognized by those of skill in the art that numerous other support arrangements are possible.

A boom 18 may project from overhead support 12. Boom 18 may include a swivel joint 20 having a vertically oriented axis of rotation 22.

A charge head 24 bearing an array of charging electrodes 26 is supported from and depends from boom 18. The array of charging electrodes 26 comprises at least four charging electrodes 26 and may for example assume a format corresponding to that shown in FIG. 7 of related U.S. utility patent application Ser. No. 12/657,533, now issued as U.S. Pat. No. 8,174,238, entitled CHARGING CONTACT ARRAY FOR ENABLING PARALLEL CHARGING AND SERIES DISCHARGING OF BATTERIES, filed concurrently with the instant application and included herein by reference. Charge head 24 may be selectively lowered into contact with charge receiving electrodes 77 (FIG. 3) of motor vehicle 91 for charging the batteries 84 thereof.

Upon completion of the charging operation, Charge head 24 may subsequently be raised to be out of the way of motor vehicle 91. To accomplish this, charge head 24 is supported by and depends from an overhead suspension system that may include the boom 18 as well as other components that enable the charge head 24 to be maneuvered upwardly, downwardly, and laterally relative to the overhead support 12. The overhead suspension system may comprise a plurality of rigid members or links such as the rods 28 and 30 and a hydraulic cylinder 32. Of course, any suitable flexible supporting apparatus such as lengths of chain, not shown, may be incorporated into the overhead suspension system if desired.

Hydraulic cylinder 32 will be understood to comprise conventional elements of a hydraulic cylinder assembly, such as a cylindrical chamber enclosing a piston (not separately shown) that may be raised and lowered (as depicted in FIG. 1) by hydraulic fluid under pressure. The piston may be ultimately coupled to the charge head 24. A source 52 of pressurized hydraulic fluid may provide pressurized hydraulic fluid to act on the piston selectively according to a manual control (to be described hereinafter) so as to raise and lower the charge head 24. It will be recognized by those of skill in the art that additional, ancillary components, for example, hydraulic supply and return conduits 60, 62 are required to operate hydraulic cylinder 32 and these components are assumed to be provided although not described or individually identified.

Rod 28 terminates in a clevis 34. One end of hydraulic cylinder 32 may be coupled to clevis 34 by a connecting member 36 containing a bore, neither visible nor identified in FIG. 1, through which an axle 38 extends. Axle 38, in conjunction with connecting member 36 forms a swivel connection 40 having an axis of rotation 42. A second swivel connection 44 of construction similar to that of the swivel connection 40 may be provided by a second clevis 46 that terminates rod 30 at a lower end of hydraulic cylinder 32. The second swivel connection 44 has an axis of rotation 48. Hydraulic cylinder 32, which is rigid along its length, may be constructed so that the rod 30 rotates about an axis of rotation 50 that is coaxial with the rod 30.

It will be recognized that the overhead suspension system comprises a plurality of rigid links collectively having at least three swivel connections (i.e., swivel connection 40, swivel connection 44, and swivel connection of the rod 30 within the hydraulic cylinder 32). The three axes of rotation 42, 48, and 50 may be disposed perpendicularly to one another, thus enabling movement of charge head 24 in two opposed directions within each of three orthogonal directions or in the three dimensions, which is referred to herein as providing six degrees of freedom of motion of the charge head 24.

The hydraulic cylinder 32 forms part of a hydraulic assist system disposed to raise and lower the charge head 24. Hydraulic cylinder 32 is ultimately supported from overhead support 12.

Referring now also to FIG. 2, there is shown a front elevational detailed view of a portion of charge head 24. Charge head 24 comprises a plate 54 to which the charging electrodes 26 are mounted, depending from a lower surface thereof. Each charging electrode 26 may be enclosed within an electrically insulating sleeve 56. Each charging electrode 26 may have a flat metallic conductive charge transmitting charging surface 58. While the charging electrodes 26 may be part of an inductive coupling, not shown, if desired, it is preferred to employ directly contacting conductive surfaces, such as the charging surfaces 58, between the charging electrodes 26 and the charge receiving electrodes 77 of motor vehicle 91 because inductive coupling charging introduces inefficiencies in electrical transmission.

Insulating sleeves 56 may extend well beyond their respective charging electrodes 26 such that the charging surfaces 58 are recessed within their respective sleeves 56. This feature, which may be regarded as a protective hood arrangement for covering each charging electrode 26 when in charge transferring relation to an electrode being charged by the charging electrode system 10. This helps prevent unintended paths to ground. It would be possible for the sleeves 56 to be arranged to retract relative to the charging electrodes 26 if desired, this option not shown, so that the charging electrodes 26 could be exposed fully or more than they are in the fully recessed position relative to the sleeves 56.

Charge head 24 may comprise a maneuvering handle 64 coupled thereto. The maneuvering handle 64 may be of the type typically provided in so-called go-karts, and may utilize two bolts 65 to fasten the maneuvering handle 64 to charge head 24. The maneuvering handle 64 has a first and second padded grasping member 66, 68, respectively, disposed in a spaced apart relationship to one another. This spaced apart arrangement obliges a user to use two hands, not shown, to grasp both first and second grasping elements 66, 68 to manipulate charge head 24. This two-handed approach allows the user to have a better grasp on and control over maneuvering handle 64 and hence over the charge head 24 than would be the case if the maneuvering handle 64 were capable of being grasped in the center by one hand. Also, because both hands are occupied as they grasp the maneuvering handle 64, they are out of the way of the charge head 24 as it lowers to engage the charge receiving electrodes 77 of motor vehicle 91, and thus are safe from being pinched by the charge head 24 as it descends.

Two types of manual controls may be seen on the maneuvering handle 64. One is a manual control 70 disposed to cause the pressurized hydraulic fluid to act on the piston of the hydraulic cylinder 32 selectively so as to raise and lower the charge head 24. Manual control 70 may be a rocker style pushbutton switch which when depressed at the upper end it causes the hydraulic circuit, not shown, to deliver pressurized hydraulic fluid, not shown, to raise the charge head 24. Conversely, when control 70 is depressed at the lower end, the charge head 24 is caused to be lowered. It will be recognized that many alternate forms of control element may be substituted for the rocker switch chosen for purposes of disclosure. Such alternate controls include, but are not limited to pushbutton switches, dials (i.e., rotary controls), joysticks, touchscreen panels, or any other type of manual controller. Manual control 70 may control electrical circuits, not shown, to effect delivery of hydraulic fluid to hydraulic cylinder 32. Such circuits are believed to be well known to those of skill in the art and are not further described herein.

A second type of manual control included upon maneuvering handle 64 is a safety arrangement known as a "dead man" switch system. A first dead man switch 72 and a second dead man switch 74 are disposed on opposite sides maneuvering handle 64. Unless both dead man switches 72, 74 are activated by respective left and right hands of an operator, the hydraulic assist system for maneuvering charge head 24 remains disabled. This arrangement further ensures the use of both hands of the operators on maneuvering handle 62. First and second dead man switches 72, 74 may be implemented as mechanical switches or other types of electrical sensors such as a capacitive sensor to sense the presence of both user hands on maneuvering handle 64. Circuitry for implementing such dead man arrangements is also believed to be well known to those of skill in the art and is not further described herein.

Charge head 24 may include an alignment element disposed to assure that the charge head 24 effectively engages the array of charging electrodes 77 in a predetermined direction and orientation relative to the array of charging electrodes 26. The alignment element may comprise at least two pins 76, each having a tapered blunt exposed end 78. If desired, pins 76 may be tapered along all or a significant extent of their length and not just at their exposed ends 78. Pins 76 may mate with corresponding holes, not specifically identified, formed proximate the array of charge receiving electrodes 77 of motor vehicle 91.

Referring now also to FIG. 3, there is shown a front elevational, schematic view of the vehicle charging system 10 and revealing additional elements and details thereof.

Charge head 24 is shown in a position approaching an array of charge receiving electrodes 77 of motor vehicle 91 with which the charge receiving electrodes 77 are associated. The array of charge receiving electrodes 77 may be similar to that described in the related, included by reference application Ser. No. 12/657,533, now issued as U.S. Pat. No. 8,174,238, entitled CHARGING CONTACT ARRAY FOR ENABLING PARALLEL CHARGING AND SERIES DISCHARGING OF BATTERIES, filed concurrently herewith.

Charging electrode system 10 includes a DC electrical power source 80, which may comprise transformer and converting apparatus for transforming electrical power supplied from an electrical utility as relatively high voltage AC current to relatively low voltage DC. Alternatively, the DC electrical power source 80 may comprise a motor/generator arrangement, a fossil fuel powered generator, or any other DC power source currently known, or yet to be devised. It will be recognized that DC power source 80 may include appropriate circuit protection devices (e.g., fuses, circuit breakers, ground fault interrupters (GFIs), etc.), not specifically identified.

Such circuit protection devices are also well known to those of skill in the art. Appropriate DC power sources are well known to those of skill in the art and, consequently, are not described in further detail herein.

Charging electrodes 26 of the charge head 24 may be connected to the DC electrical power source 80 by suitable electrical conductors 82. Conductors 82 are typically insulated stranded, conductors and may be implemented as multiple cables to provide the required current carrying capacity. Conductors 82 typically extend through the interior of or along the exterior of tower 14 and boom 18.

A current sensor 86 and/or a voltage sensor, not shown, form part of a charge monitoring system disposed to sense progress of charging of batteries 84. The monitoring system may determine and, optionally, report the state of charge of the battery 84, the rate of charge, and also may indicate the completion of charging. Completion of charging may be annunciated locally (i.e., near charge head 24) by an annunciator 88 which may be visual, auditory, or both visual and auditory. In addition or in lieu of a local annunciator 88, upon completion of charging, a wireless signal may be generated to communicate this information to a user remote from vehicle 91 and charge head 24. Communications apparatus 90 generates a wireless signal that may, for example, communicate with a cellular telephone, a personal data assistant (PDA), a beeper, or a dedicated communications device adapted solely to receive a signal, none of which are shown, from communication apparatus 90. Remote signaling may be utilized to advise a vehicle operator, not shown, who may, for example, have left his or her motor vehicle 91 to be charged in his or her absence. Devices and technology for such remote communication is believed to be well known to those of skill in the art and is, consequently, not further discussed herein.

The monitoring system may also monitor the temperature of battery 84 or any other part of the charging system between the charger or charging device and the vehicle battery group being charged by the charging electrode system 10. For example, the temperature of cables, cable connections, or the charging contacts may be temperature monitored. A temperature sensor 92 in conjunction with a feedback system 94 transmits temperature information to the monitoring system. The monitoring system may then take appropriate action, such as reducing the rate of charge or even disconnecting battery 84 from power responsively to battery temperature by operating a controller 96 arranged to control power to the conductors 82 of the charging circuit. Of course, the controller 96 may alternately be arranged to control inputs of AC power to the DC electrical power source 80 rather than regulating outputs of DC power. Devices, systems and technology for temperature monitoring and/or controlling current responsive to temperature data are believed to be well known to those of skill in the art. Consequently, not further description thereof is provided herein.

The charging electrode system 10 may optionally include a security system to sense the identity of the motor vehicle 91 connected to the charging electrode system 10. A radio frequency identification (RFID) transponder 98 may interrogate a radio frequency identification tag 100 located onboard the motor vehicle 91. The RFID transponder 98 may be utilized for several purposes. It may, for example, determine an optimum charging rate from information supplied by the vehicle manufacturer. It might interrogate RFID tag 100 for a vehicle identification number (VIN) and automatically check a database of stolen vehicles. If the vehicle appears to be stolen, a disabling signal could be sent to the vehicle 91 and appropriate authorities (e.g., the police) may be notified. The system may also be utilized by authorities if the vehicle were to be stolen during the charging operation. Systems for accomplishing such monitoring and notification tasks are believed to be known to those of skill in the art and are not discussed in more detail herein.

A further safety feature of the novel charging system 10 of the invention is that the movement of charging head 24 into contact with charge-receiving contacts 77 within motor vehicle 91 is that the vehicle's motor, not shown, is completely disabled.

It is contemplated that one or more charging electrode systems such as the charging electrode system 10 may be utilized in a commercial recharging station for electrically powered vehicles. Such a station may offer both electrical recharging services and also may sell combustible fuels. Because it is contemplated that the charging electrode system 10 of the invention is usable in a commercial recharging facility (i.e., an electric "gas station"), not shown in its entirety, the charging electrode system 10 may include a payment acceptance apparatus to receive payment for electrical energy delivered by charging electrode system 10. The payment acceptance arrangement may inhibit delivery of electrical power until payment is made. The payment acceptance arrangement may comprise a conventional point of sale processor 102 for reading electronic payment cards such as debit cards and credit cards, not shown. Point of sale (POS) equipment and systems are believed to be well known to those of skill in the art and are not further discussed herein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A system for recharging a battery of an electrically powered vehicle, comprising:
   a) a charging head comprising a plurality of charging electrodes, each adapted for selective electrical interconnection with a corresponding, mating charge-receiving electrode in an electrically powered vehicle having a battery to be recharged, each of said charging electrodes being operatively connected to a source of electrical power;
   b) a support operatively connected to said charging head and adapted to suspend and facilitate selectively positioning said charging head into a charge transferring relationship with said electrically powered vehicle, wherein said support comprises an overhead suspension system further comprising an apparatus for selectively maneuvering said charge head at least downwardly and laterally, wherein said overhead suspension system comprises a plurality of rigid links collectively comprising at least three swivel connections, each of said at least three swivel connections having a respective axis of rotation, each respective axis of rotation being mutually orthogonal to one another, whereby the overhead suspension support provides at least six degrees of freedom of motion of said charge head; and
   c) a charge monitoring system disposed between said charging head and said source of electrical power, said charge monitoring system containing at least one device selected from the list: an electrical current sensor, an electrical voltage sensor, a rate-of-charge monitor, a temperature monitor, a rate-of-charge controller and means for electrically disconnecting said charging head from said battery responsive to a sensed condition.

2. The system for recharging a battery of an electrically powered vehicle as recited in claim 1, further comprising:
   d) a maneuvering handle coupled to said charge head, comprising:
   i) a first grasping element adapted for gripping by a first hand of an operator;
   ii) a second grasping element spaced apart from said first grasping element and adapted for gripping by an opposite hand of said operator;
   whereby an operator must use both hands to grasp both said first grasping element and said second grasping element.

3. The system for recharging a battery of an electrically powered vehicle as recited in claim 2, further comprising:
   e) a hydraulic assist system operatively connected to said overhead suspension system and to said charging head, said hydraulic assist system comprising:
   i) a hydraulic cylinder supported from said overhead support;
   ii) a piston operatively connected to said charge head;
   iii) a source of pressurized hydraulic fluid operatively connected to said piston; and
   iv) a control disposed between said piston and said source of pressurized hydraulic fluid;
   whereby said charge head may selectively be raised and lowered by said piston in response to said control.

4. The system for recharging a battery of an electrically powered vehicle as recited in claim 3, wherein said control comprises at least one control selected from the group: a pushbutton; a hydraulic valve, and at least one dead man control operatively connected to said hydraulic assist system.

5. The system for recharging a battery of an electrically powered vehicle as recited in claim 4, wherein said at least one dead man switch comprises:
   f) a first dead man switch disposed on said maneuvering handle proximate said first grasping element for actuation by said first hand of said operator; and
   g) a second dead man switch disposed on the maneuvering handle proximate said second grasping element for actuation by said opposite hand of said operator;
   actuation of both said first dead man and said second dead man switch being required to actuate said hydraulic assist system.

6. The system for recharging a battery of an electrically powered vehicle as recited in claim 1, wherein said power source comprises a source of DC voltage.

7. The system for recharging a battery of an electrically powered vehicle as recited in claim 1, wherein said plurality of charging electrodes comprises at least four individual charging electrodes.

8. The system for recharging a battery of an electrically powered vehicle as recited in claim 1, wherein each one of said plurality of charging electrodes has a flat conductive charge transmitting charging surface.

9. The system for recharging a battery of an electrically powered vehicle as recited in claim 1, further comprising:
   d) an alignment element disposed on said charging head adapted to interactively engage a mating alignment element of said electrically powered vehicle such that said plurality of charging electrodes of said charging head engages an array of charge-receiving electrodes disposed in said electrically powered vehicle in a predetermined direction and orientation relative thereto.

10. The system for recharging a battery of an electrically powered vehicle as recited in claim 9, wherein said alignment element comprises at least two pins each having a tapered blunt exposed end.

11. The system for recharging a battery of an electrically powered vehicle as recited in claim 1, further comprising:
   d) a monitoring system operatively connected to a at least one of said source of electrical power and said battery of said electrically powered vehicle, said monitoring system disposed to perform at least one function selected from the group: to sense progress of charging of batteries connected to said charging electrode system, and to discern and report completion of charging of said batteries connected to said charging electrode system.

12. The system for recharging a battery of an electrically powered vehicle as recited in claim 11, wherein said monitoring system comprises a visual indicator disposed to annunciate completion of charging.

13. The system for recharging a battery of an electrically powered vehicle as recited in claim 11, wherein said monitoring system comprises means for generating a wireless communications signal to annunciate completion of charging.

14. The system for recharging a battery of an electrically powered vehicle as recited in claim 13, wherein said means for generating a wireless communications signal comprises apparatus for generating a cellular telephone call.

15. The system for recharging a battery of an electrically powered vehicle as recited in claim 14, wherein said means for generating a wireless communications signal comprises apparatus transmitting a message to a personal digital assistant.

16. The system for recharging a battery of an electrically powered vehicle as recited in claim 11, wherein said monitoring system further comprises apparatus disposed to monitor temperature of at least one of the group: the batteries being charged by said charging electrode system, an interconnecting cable, a cable connection, and said charging electrode system.

17. The system for recharging a battery of an electrically powered vehicle as recited in claim 16, wherein the monitoring system includes a thermistor.

18. The system for recharging a battery of an electrically powered vehicle as recited in claim 17, wherein said monitoring system further comprises a controller to vary a rate of charge being delivered by said system for recharging a battery responsive to battery temperature sensed by said thermistor.

19. The system for recharging a battery of an electrically powered vehicle as recited in claim 1, further comprising:
   d) a security system disposed to sense identity of a vehicle being connected to said system for recharging a battery.

20. The system for recharging a battery of an electrically powered vehicle as recited in claim 1, further comprising a payment acceptance arrangement disposed to control delivery of electrical power through said system for recharging a battery, wherein said payment acceptance arrangement inhibits delivery of electrical power until payment is made.

21. The system for recharging a battery of an electrically powered vehicle as recited in claim 1, further comprising a protective hood arrangement for covering each charging electrode when each charging electrode is not in charge transferring relation to an electrode being charged by the charging electrode system.

22. The system for recharging a battery of an electrically powered vehicle as recited in claim 1, wherein said source of electrical power comprises a power converter system adapted to receive input electrical power as alternating current and to convert said alternating current to direct current.

23. The system for recharging a battery of an electrically powered vehicle as recited in claim 22, wherein said power converter system transforms said alternating current at an input voltage to direct current at a voltage lower than said input voltage.

* * * * *